Figures 1, 2:
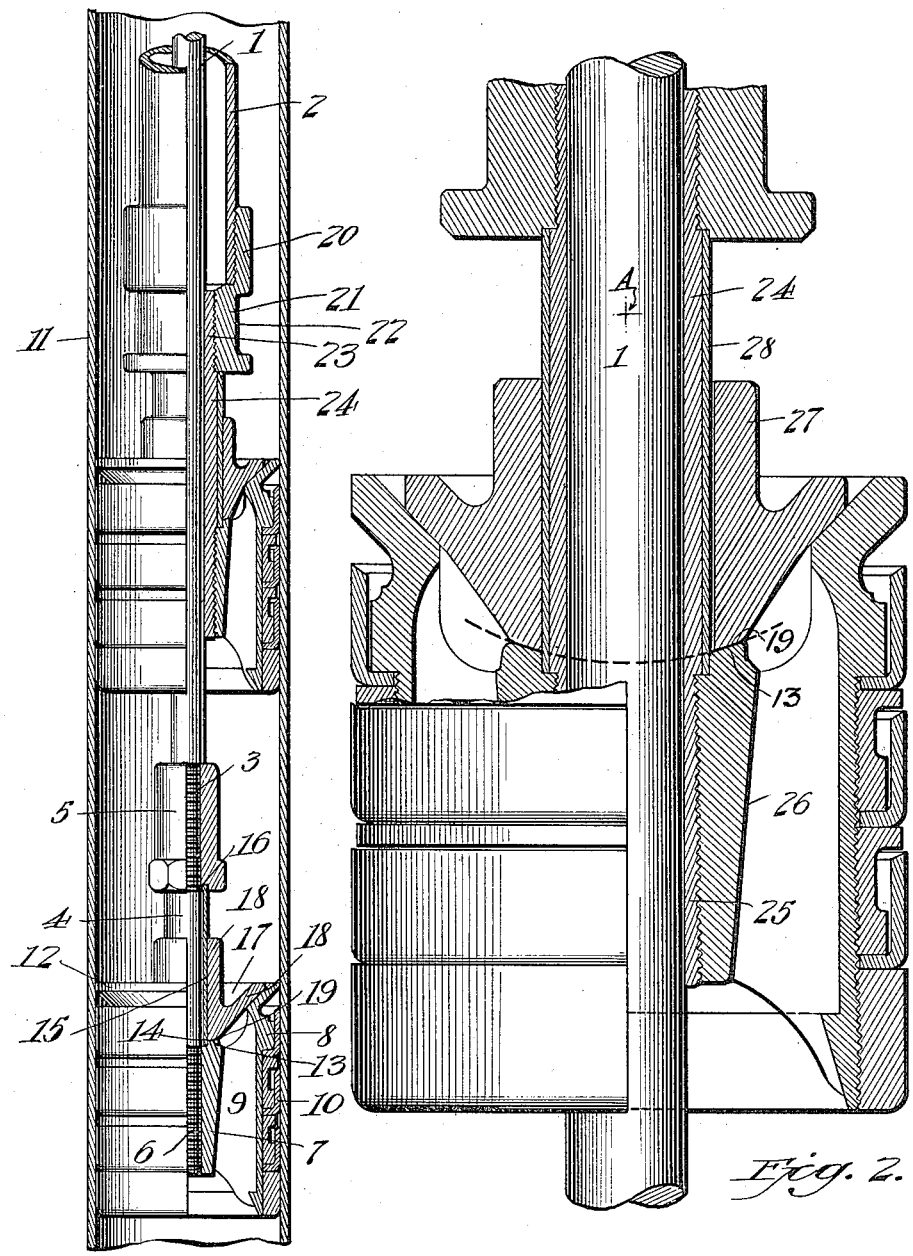

S. M. FULTON.
VALVED PISTON.
APPLICATION FILED SEPT. 3, 1913.

1,164,178.

Patented Dec. 14, 1915.

Witnesses

Inventor
S. M. Fulton
By E. B. Stocking
Attorney

UNITED STATES PATENT OFFICE.

SAMUEL M. FULTON, OF POMONA, CALIFORNIA, ASSIGNOR TO THE POMONA MANUFACTURING COMPANY, OF POMONA, CALIFORNIA, A CORPORATION OF CALIFORNIA.

VALVED PISTON.

1,164,178.  Specification of Letters Patent.  Patented Dec. 14, 1915.

Application filed September 3, 1913. Serial No. 787,926.

*To all whom it may concern:*

Be it known that I, SAMUEL M. FULTON, a citizen of the United States, residing at Pomona, in the county of Los Angeles and State of California, have invented certain new and useful Improvements in Valved Pistons, of which the following is a specification, reference being had therein to the accompanying drawing.

This invention relates to certain new and useful improvements in valved pistons used in connection with deep wells; the object being to provide a valve with a piston which is so constructed that a perfect seat will be obtained so as to support the body of liquid carried by the piston in its upward movement, thereby overcoming the difficulties now existing with this class of pistons in use, as the valve or clapper is not hammered out of shape by constant use and the leakage of the valve is prevented.

A further object of the invention is to provide a steel wear jacket for the valve or clapper, which can be easily and quickly attached or detached so as to protect the valve stem from the wear of the clapper in its movement thereon.

Another object of the invention is to provide a valved piston which is exceedingly simple and cheap in construction, the parts thereof being so mounted in respect to each other, that they can be readily assembled or disassembled in order to repair the valve.

Other and further objects and advantages of the invention will be hereinafter set forth, and the novel features thereof defined by the appended claims.

In the drawing—Figure 1, is a central vertical section, partly in elevation, with the valved piston and casing showing the application of the same to a double piston pump; and Fig. 2, is an enlarged vertical section of the upper piston, partly in elevation.

Like numerals of reference refer to like parts in the several figures of the drawings.

In the drawing, I have shown my improved construction of valved piston in connection with the pistons of a double piston pump, wherein the superposed pistons move alternately toward and from each other in their movements. As is common in pumps of this construction, the lower piston is carried by an operating rod 1 and the upper piston, by a tube 2, as will be hereinafter fully described. The lower end of the rod 1 is threaded as shown at 3 and is connected to a valve stem 4 by a coupling member 5; said valve stem having a threaded lower end 6 upon which is mounted the internally threaded hub portion 7 of a cylindrical piston 8; said hub being provided with radial spokes 9 which are preferably formed integral with the piston and hub in order to form passages so as to allow the liquid to pass freely through the piston.

The form of piston herein shown, is provided with packing rings 10 in order to fit snugly within the well casing 11; the upper end of said piston being provided with an annularly conical valve seat 12. The hub 7 of the piston is provided with an annular concaved seat 13 at its upper end in a plane below the horizontal plane of the seat 12 whereby the piston is provided with two seats in different horizontal planes, but concentric with each other.

The hub is annularly rabbeted as shown at 14 in which is seated the lower end of a steel wear jacket 15 surrounding the valve stem and seated at the upper end, is an annular rabbet 16 formed in the coupling 5, whereby the stem 4 will be protected as will be later described.

Mounted on the jacket 15 is a valve or clapper 17 having a sleeve portion 18 adapted to engage the coupling member 5 in order to limit the upward movement of the valve and this valve is preferably mounted loosely upon the wear jacket in order to allow the same to have free movement so as to open and close by the pressure of the liquid.

The valve 17 is provided with a conical portion 18 co-acting with the conical valve seat 12 and terminates at its lower end in an annular convexed portion 19 which co-acts with the concaved seat 13 struck on the arc of a circle with A as the center so as to seat itself in order to form a perfect seat even if the valve is dislodged from its normal position when seated by the volume of liquid which has passed from the piston and is being lifted thereby, whereby a valve is formed for the piston having two seats so constructed that all leakage is prevented. This constitutes the lower piston of a double piston pump and while I have shown certain construction and manner of mounting the piston in position upon the operating rod 1, I do not wish to limit myself to any exact construction as the minor features may be changed without departing from the spirit of my invention.

The tube 2 is externally threaded at its lower end and fits within a socket 20 formed in the upper end of a coupling member 21 which is internally threaded as shown at 22 in which is mounted the threaded upper end 23 of a tubular valve stem 24 which is provided with a reduced lower end 25 having external threads on which are threaded the hub portion of a piston 26 which is constructed substantially the same as the lower piston and is provided with concentric seats arranged in different horizontal planes; one seat being conical and the other concaved to receive the coöperating seating portions of a valve or clapper 27 which is loosely mounted upon a steel jacket 28 surrounding the stem 24 which is held in its proper position at its upper end and lower end and rabbets formed respectively in the coupling member 21 and hub 26. This construction constitutes the upper piston in a double piston pump, and a description of the lower piston is sufficient for both, with the exception that in the upper piston, the same is carried by a tubular valve stem and the lower piston is carried by a rod or solid valve stem.

The arrangement of superposed pistons in a double piston pump is such that they move alternately toward and from each other and while I have shown this particular manner of mounting the respective pistons upon the operating rod and tube, it is of course understood that the same can be mounted in various other ways without departing from the spirit of my invention; the sole novelty of this invention being to provide a valved piston with a steel wear jacket for the valve which is loosely mounted thereon and the provision of concentric seats in the pistons in different horizontal planes, one seat being conical and the other seat being concaved; the valve having coöperating portions conforming in shape to the seats whereby the valve will form a perfect closure if the same is not seated evenly as is the case with pistons of this character now in use.

From the foregoing description, it will be seen that I have provided a valved piston wherein the piston is provided with a hub portion having a seat and the cylindrical portion of the piston is provided with a seat which is concentric to the first-mentioned seat, but in a higher horizontal plane; these seats being arranged to receive coöperating portions of a valve loosely mounted upon a wear jacket carried by the valve stem in such a manner that the wear on the valve stem is reduced so as to prevent the replacing thereof; the jacket being so mounted that the same can be readily detached and another jacket substituted therefor.

I claim:

1. In a valved piston, the combination with a valve stem, of a jacket surrounding said valve stem, a piston carried by said stem, a coupling member secured to said stem, a wear jacket arranged between said piston and coupling member and secured in position by said members, said piston being provided with concentric valve seats, and a valve mounted upon said wear jacket having coöperating seating portions.

2. A valved piston having a stem carried thereby, a seat formed in said piston, a jacket arranged in said seat, a valve surrounding said jacket, and a coupling member carried by said stem engaging the upper end of said jacket.

In testimony whereof I affix my signature in presence of two witnesses.

SAMUEL M. FULTON.

Witnesses:
Wm. J. Wilkinson,
Charles A. Steadman.

Copies of this patent may be obtained for five cents each, by addressing the "Commissioner of Patents, Washington, D. C."